United States Patent [19]

Basile et al.

[11] Patent Number: 5,014,285
[45] Date of Patent: May 7, 1991

[54] FREQUENCY SHIFT KEYING COMMUNICATION SYSTEM WITH SELECTABLE CARRIER FREQUENCIES

[75] Inventors: Philip C. Basile, Turnersville, N.J.; Bruce E. Kabernagel, Levittown, Pa.

[73] Assignee: General Electric Company, Camden, N.J.

[21] Appl. No.: 413,415

[22] Filed: Sep. 27, 1989

[51] Int. Cl.⁵ ............................................. H04L 27/12
[52] U.S. Cl. ...................................... 375/62; 332/100; 328/14
[58] Field of Search ............................ 375/9, 62, 64, 65; 332/9 R, 11 R; 370/110.2; 364/718, 721; 379/361, 418; 328/14

[56] References Cited

U.S. PATENT DOCUMENTS

| | | | |
|---|---|---|---|
| 2,866,161 | 12/1958 | Davidoff | 332/19 |
| 3,286,191 | 11/1966 | Cornwell | 331/11 |
| 3,668,562 | 6/1972 | Fritkin | 375/62 |
| 3,703,686 | 11/1972 | Hekimian | 331/11 |
| 3,801,912 | 4/1974 | Ragsdale | 332/9 R |
| 3,993,868 | 11/1976 | Balcewicz | 178/66 R |
| 3,997,855 | 12/1976 | Nash | 375/62 |
| 4,368,439 | 1/1983 | Shibuya et al. | 332/9 R |
| 4,409,563 | 10/1983 | Vandegraaf | 331/11 |
| 4,454,486 | 6/1984 | Hassun et al. | 332/16 R |
| 4,528,522 | 7/1985 | Matsuura | 331/2 |
| 4,618,966 | 10/1986 | Stepp et al. | 332/9 R |
| 4,648,060 | 3/1987 | Allen et al. | 364/851 |
| 4,740,995 | 4/1988 | Schevin et al. | 375/62 |

Primary Examiner—Stephen Chin
Attorney, Agent, or Firm—Raymond E. Smiley

[57] ABSTRACT

A frequency shift keying system for transmitting a signal which is a function of supplied data, includes first and second frequency generators producing first and second frequencies which differ in value by an amount which is a function of the maximum baud rate of the data. A counter is responsive alternately to one and the other of the two frequencies supplied thereto as a function of the data values for alternately counting up and down between values which differ by some given amount. The counter output in analog form is the transmitted signal. This system is particularly adapted to minimum frequency shift keying.

10 Claims, 3 Drawing Sheets

FREQUENCY SHIFT KEYING COMMUNICATION SYSTEM WITH SELECTABLE CARRIER FREQUENCIES

BACKGROUND OF THE INVENTION

1. Field of Invention

This invention relates to frequency shift keying systems and, more particularly, to such systems which can easily transmit at a selectable one of multiple carrier center frequencies.

2. Description of the Prior Art

With the ever increasing use of high density multi-channel radio communications, the electromagnetic energy spectrum has become overcrowded. Thus, in order to avoid inter-channel interference, strict control of communication ranges in such communication systems is desirable. Moreover, since most medium and high output power transmitters perform with higher efficiency when operating at or near saturation of their input versus output amplitude transfer function, the ability to utilize transmitters with non-linear amplitude transfer functions has become an important design criteria in such communication systems.

Frequency shift keying (FSK), a technique of communicating digital information using discrete frequencies to represent specified symbols, has properties which are desirable in controlling the bandwidth of the system and for use with non-linear transmitters. Binary FSK, for example, transmits a first (mark) frequency to represent a binary one and a second (space) frequency to represent a binary zero. The amplitude of the carrier, in the ideal case, is invariant and thus can pass through non-linear amplifiers with minimal degradation of signal quality. Further, proper choice of the difference between the mark and space frequencies and the time of switching between these frequencies can provide strict control and minimization of the radiated spectrum thereby minimizing the required channel bandwidth and the spurious emission of power outside the channel bandwidth.

Prior art frequency shift keying systems are designed to transmit at a single carrier center frequency. There are, however, applications where transmission at multiple carrier frequencies in sequence with rapid changeability in frequencies is desired. In the prior art, multiple transmitter systems would be employed with each transmitter at a different carrier center frequency.

SUMMARY OF THE INVENTION

In accordance with a preferred embodiment of the present invention, a frequency shift keying system for transmitting a signal representing supplied binary data, comprises in combination means responsive to the maximum baud rate of the supplied data for producing signals at first and second frequencies $f_1$ and $f_2$ that differ by an amount which is a function of the value of the maximum baud rate, means for alternately counting up and down between two preselected counts which differ by value N, successive counts being at the first frequency when the data is at one of the binary values and successive counts being at the second frequency when the data is at the other of the binary values and means responsive to the count in the counter as a function of time for producing the signal for transmission, the frequency of the transmission signal corresponding to $F_1/N$ or $f_2/N$ depending on the value of the supplied data.

DETAILED DESCRIPTION

Figure 1:
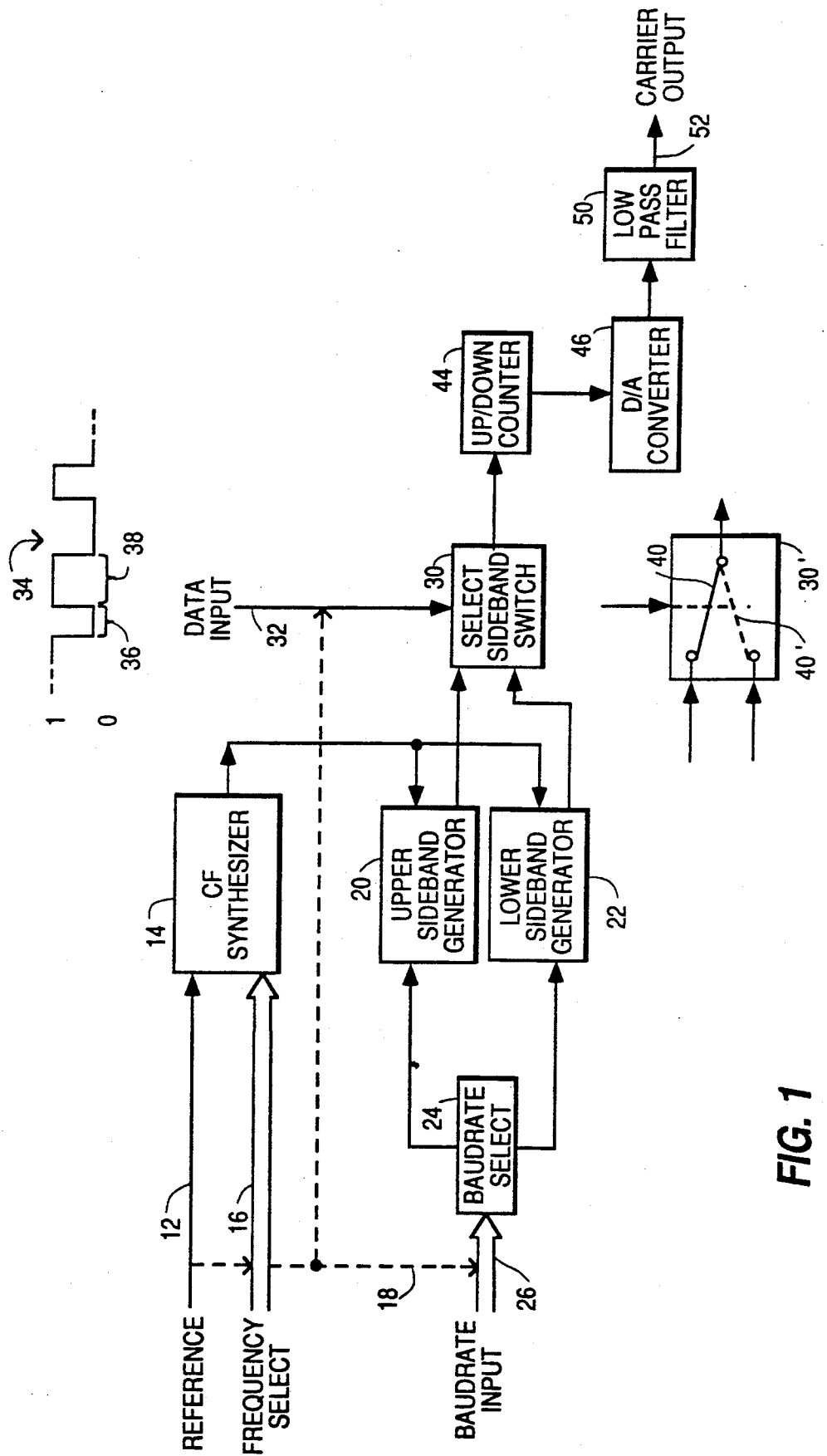
FIG. 1 is a frequency shift keying system involving multiple carrier frequencies in block diagram form.

In FIG. 1 a clock reference source signal applied on line 12 is coupled to one input of a continuous frequency synthesizer 14. A second input to the synthesizer 14 is a multi-bit frequency select signal applied on line 16, the value of which represents the desired center frequency. The frequency select signal is advantageously changed coherently with the reference signal, as indicated by dashed line 18, which may be from, for example, Cesium, Rubidium or a stable crystal oscillator. The reference frequency value may be 1 MHz, for example, and the output of synthesizer 14 may be, for example, 10 kHz-100 kHz and vary over a decade and could vary in as little as 1 Hz steps, for example.

The output of synthesizer 14 is coupled to an input of each of upper sideband and lower sideband generators 20 and 22, respectively, which generate signals at frequencies $f_1$ and $f_2$ above and below, respectively, the frequency of synthesizer 14 by some given amount and therefore $f_1$ and $f_2$ differ from each other by twice that given amount. That given amount is a direct function of signal applied from baud rate select circuit 24 as determined by a multi-bit signal applied on line 26. The signal on line 26, which advantageously changes coherently with the reference signal applied on line 12, as indicated by dashed line 18, represents the maximum baud rate (one half the bit rate) of a data signal to be discussed hereinafter. The outputs of upper sideband generator 20 and lower sideband generator 22 are coupled to respective inputs of a select sideband switch 30. Switch 30 is, as indicated at 30', simply a single-pole, double-throw switch. The output of switch 30 is coupled to the input of an up/down counter 44. Control of switch 30 is by a data input signal on line 32.

The data on line 32 is simply binary information as illustrated by way of example in waveform 34 which is a plot of amplitude versus time. Thus, at some times the waveform 34 may be a relatively low value representing a logic level zero (logic 0) as at waveform portion 36 and at other times is a relatively high value representing a logic level one (logic 1) as at portion 38. It should also be noted that waveform 34 advantageously changes coherently with the value of reference signal applied at input 12, as indicated by dashed line 18. By way of example, the time duration of the logic 0 indicated at 36 is equivalent to the maximum bit rate or, said another way, one "bit time". The value applied on line 26 is twice that time duration. Further, by way of example, the logic 1 signal indicated at 38 is, by way of example, two bit times in duration.

Figure 3:
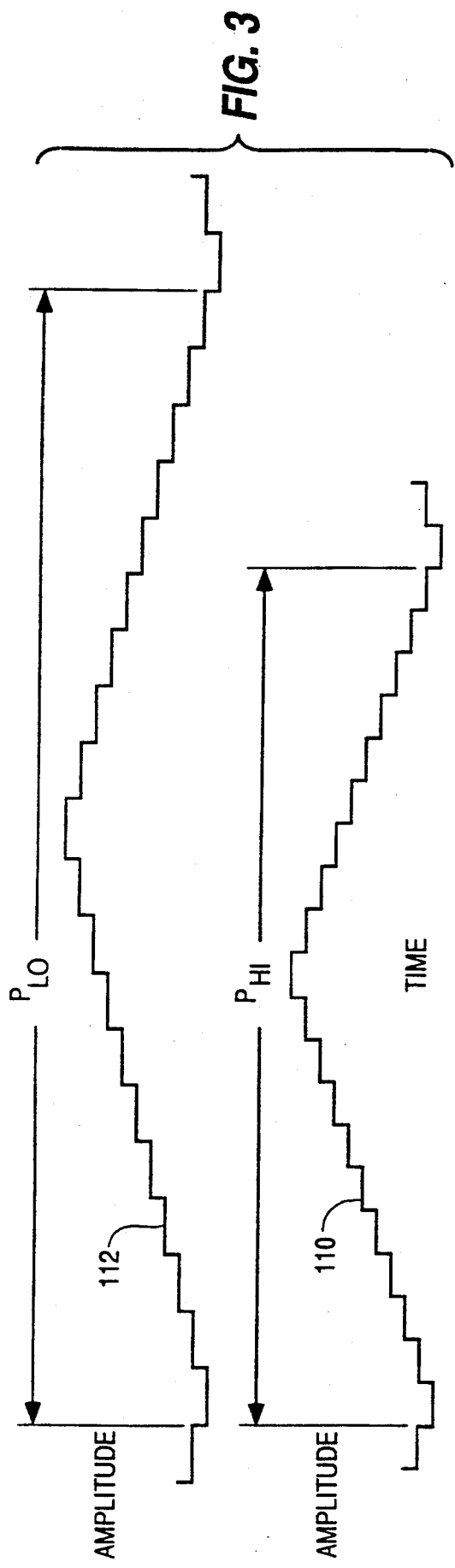
FIG. 3 is a set of waveforms in the time domain which will be useful in understanding the operation of the system of FIGS. 1 and 2.

When data input 32 is at a logic 1, switch 30 is set, as illustrated by the solid line 40 in block 30', so as to pass the relatively higher frequency signal from upper sideband signal generator 20 to up/down counter 44. Conversely, when data input on line 32 is at a logic 0, switch 30 is set, as illustrated by the dashed line 40', so as to pass the relatively lower frequency signal from lower sideband generator 22 to up/down counter 44. Counter 44 is a simple up/down counter which counts up by one step as each cycle of signal is received at its input until it reaches a value of N and then it begins to count down, counting down to a value of 0 as the next N cycles of signal are received at its input and the process repeats. An exemplary value of N is 10. The output of counter 44 is a multi-bit signal which is applied to digital-to-analog (D/A) converter 46. The output of converter 46 is, as illustrated in FIG. 3, a triangular stairstep wave having a relatively short period if changes in the counter are caused by the output signal from upper sideband generator 20 and a relatively long period if changes are caused by the output signal from lower sideband generator 22. The center frequency of the signal output from converter 46 is $\frac{1}{2}$N, the value of signal produced by synthesizer 14. Said another way, the center step frequency of the output signal from converter 46 is 2N times the value of the triangular frequency output signal from converter 44 and that frequency can easily be removed from the final output signal by a low-pass filter 50. Further, although the carrier output signal on output line 52 from low-pass filter 50 is a triangular wave, for all practical purposes it can be considered a sine wave which is of relatively high frequency when a logic 1 value of data is being transmitted and of relatively low frequency when a logic 0 value of data is being transmitted.

Figure 2:
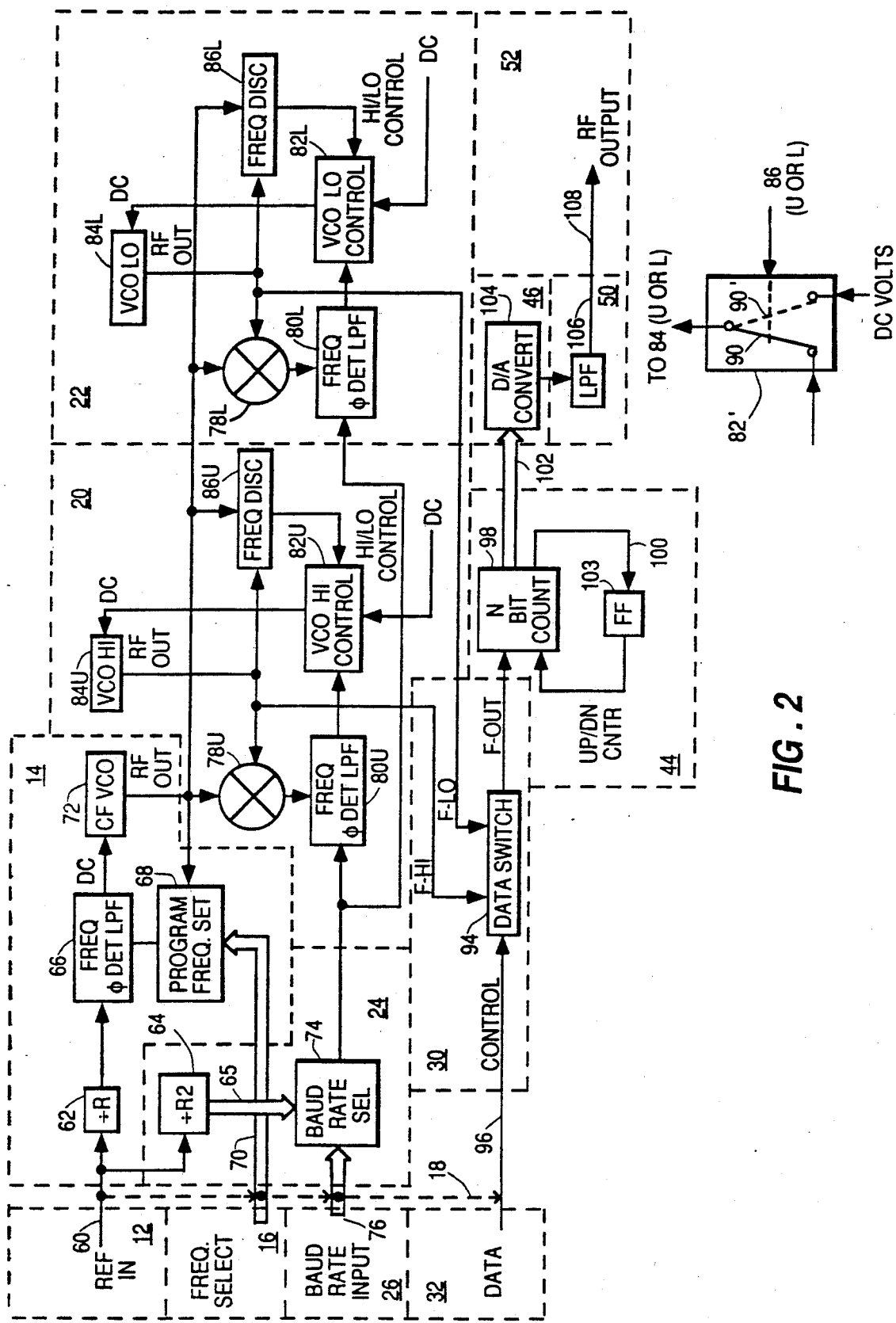
FIG. 2 is the system of FIG. 1 with more detail shown forsome of the blocks illustrated therein.

FIG. 2, to which attention is now directed, illustrates in more detail the makeup of various ones of the blocks in FIG. 1. In FIG. 2 the contents of various dashed boxes are equivalent to the blocks in FIG. 1 having the same numbers as the dashed boxes in FIG. 2. The reference signal on line 60 corresponding to the reference signal on line 12 in FIG. 1 is coupled to the input of two divide-by-R circuits, the first a divide-by-R1 circuit 62 and the second a divide-by-R2 circuit 64. The purpose of these divider circuits is to level shift the reference signal so that it will operate with logic level signals and also to divide the frequency of the reference signal to several lower frequencies. The divide-by-R circuits 62 and 64 are each readily available frequency divider integrated circuits. An exemplary output value of divide-by-R1 circuit 62 is 200 Hz. Thus, in the example R1=5000. Divide-by-R2 circuit 64 typically produces multiple output frequency signals as indicated by double signal path 65. Typical output values are the value of signal 60 divided by 256, 128, 64, 32 and 16.

The output from divide-by-R1 circuit 62 is coupled as one input to a frequency and phase detector circuit 66 of standard design. A second input to frequency and phase detector 66 is from a program frequency set circuit 68 which receives as one of its inputs on a multi-line conductor 70, the frequency select signal which is line 16 in FIG. 1. The output of frequency and phase detector 66 is a DC voltage coupled to a center frequency voltage controlled oscillator (VCO) 72. The output of VCO 72 is connected as one input to program frequency set circuit 68. The second input to circuit 68 is the frequency select signal 16 via multiconductor line 70. Circuit 68 is a divide-by-X circuit where the value of X is determined by frequency select 16. If, for example, VCO 72 is producing a signal at 100 kilohertz (kHz) and X=500, the output of circuit 68 is 200 (100K/500). That is the same value as produced by circuit 62 and VCO 72 is, therefore, in a steady state condition. If now the frequency select signal value is changed so that X=501, the output of circuit is less than 200. Therefore, the DC output of circuit 66 is momentarily raised until VCO produces 100.2 kHz at which time the output of circuit 68 is again 200 (100200/501). Thus, blocks 66, 68, and 72 form a classic frequency synthesizer employing the indirect method of synthesis. By means of those elements the carrier frequency VCO 72 is phase locked to reference signal applied on line 60 via a phase/frequency comparator 66 and set to a frequency determined by frequency select signal 16. Thus, the programmable frequency set circuit 68 sets the center frequency with a digitally programmable step increment equal to the frequency output of divide-by-R1 circuit 62, which by way of example may be, as previously mentioned, 200 Hz.

Returning to divide-by-R2 circuit 64 it is, like, divide-by-R1 circuit 62, a series of standardly available frequency divider integrated circuits. Thus, if divide-by-R2 circuit 64 divides by a total of 256, then commonly divide-by-128, divide-by-64, divide-by-32, and divide-by-16 values are all available as additional outputs from divide-by-R2 circuit 64 as applied to baud rate selector switch 74 which is basically a single-pole, multiple-throw switch. Baud rate selector 74 receives as an additional input a signal of value corresponding to the maximum data baud rate as applied on line 76 corresponding to line 26 in FIG. 1 to determine which value from circuit 64 is passed to the output of switch 74. As a result, the output of baud rate selector 74 is a binary signal whose frequency directly related to the maximum baud rate value 76 and typically equal thereto.

Upper sideband generator 20 of FIG. 1 comprises, in FIG. 2, elements 78U, 80U, 82U, 84U, and 86U. Element 78U is a mixer which mixes the output signal from center frequency VCO 72 and the output frequency of a second (upper sideband) VCO 84U. The value of output signal from mixer 78U is the difference, in absolute sense, of the two signals applied to it. As will be understood by those skilled in the art, it also produces the sum signal of the two signals applied to it but the various circuit elements can easily be designed to filter out that undesired signal. The output of mixer 78U is coupled to the input of a frequency and phase detector circuit 80U which is identical in operation to the operation of circuit 66. The second input to that circuit is from baud rate selector 74 which signal, it will be remembered, has a value which a function of the value of the maximum data baud rate.

The outputs from VCOs 72 and 84U are applied as two inputs to frequency discriminator 86. The frequency discriminator produces a signal having one of two values; arbitrarily a relatively low value when VCO 72 is producing a signal of value greater than VCO 84U (an undesirable condition), and a second relatively high value when VCO 84U is producing a higher value frequency than is VCO 72 (a desirable condition). VCO high control circuit 82U is basically a single-pole, double-throw switch as illustrated in block 82'. It receives, as its two major inputs, the output from frequency and phase detector circuit 80U and a DC voltage source. The output of VCO high control circuit 82U is coupled as the direct current input VCO 84U.

Remembering that the purpose of VCO 84U is to produce an upper sideband signal, that is, a signal of frequency greater by some value Δ than that produced by VCO 72, where Δ is determined by the maximum data baud rate, operation of upper sideband circuit 20 is as follows. The value of the output signal from mixer 78U is the absolute difference in value between the two VCOs. The signal input to frequency and phase detector circuit 80U from baud rate selector 74 determines the desired incremental frequency above the frequency of VCO 72. Thus, the output of frequency and phase detector 80U represents the signal which is required by VCO 84U to maintain the desired frequency Δ above that of VCO 72.

However, it is possible that VCO 84U is producing a signal of value below that in frequency of VCO 72 in which case the output of mixer 78U would not distinguish this undesired relationship between VCOs 84U and 72. In such instance frequency discriminator 86U would produce a signal of value such as to cause arm 90 of the switch in VCO control 82U to move to the position indicated by the dotted line 90', thus causing a DC voltage to be applied to VCO 84U. The value of the DC voltage thus applied is chosen to will insure that the output from VCO 84U is above that of VCO 72, at which time the output from discriminator 86U would change causing arm 90 to be positioned as illustrated in block 80' With the switch arm 90 as shown in block 82' the VCO output 84U will be guaranteed to be at the desired frequency above the frequency from VCO 72 due to the operation as described in connection with VCO 72.

Lower sideband frequency generator 22 in FIG. 1 is comprised of elements 78L, 80L, 82L, 84L, and 86L which are, in all respects, identical to the similarly numbered elements in upper sideband generator 20 with the letter U, except that the VCO control 82L is connected in a reverse manner to that way in which VCO control 82 is connected. That is, when VCO 84L is undesirably producing a signal higher in frequency than that produced by VCO 72, a DC value is switched to VCO 84L of value chosen to cause it to produce a frequency signal which is guaranteed to be lower than that produced by VCO 72.

The outputs from upper sideband generator VCO 84U and lower sideband generator 84L are connected to respective inputs of data switch 94 corresponding to switch 30 in FIG. 1. It will be recalled from discussion of FIG. 1 that switch 94 is merely a single-pole, double-throw switch which connects one or the other of the two frequencies applied to it to the output of the switch as controlled by the value of the data appearing on the control input line 96.

The output of data switch 94 is coupled to the clock input of an N bit up/down counter 98. An output on line 100 from counter 98 is connected to the input of a flip-flop 102, the output of which is connected back to up/down counter 98 to an input which determines whether the counter counts up or down as input pulses are received from switch 94. The output of counter 98 on multi-conductor line 102 is connected to the input of a digital-toanalog converter 104 which is the same as component 46 in FIG. 1. The purpose of converter 104 is to produce an output which is the analog equivalent of the digital values applied thereto and thus produces a triangular waveform stairstep output as illustrated in FIG. 3.

In the frequency domain the output of converter 104 includes both the frequency corresponding to the period of the triangular waveform, as illustrated in FIG. 3, and the frequency corresponding to the frequency of signal input to counter 98 from switch 94. This latter frequency component is not desired and is easily filtered out by low-pass filter 106 which is coupled to the output of converter 104.

Operation of the frequency shift keying circuit will now be described with primary reference to FIG. 1 but with reference also to FIGS. 2, 3, and 4 as required. The synthesizer 14 generates a particular value of center frequency dependent both on the value of reference signal input on line 12 and the particular frequency desired as indicated on multi-bit input line 16. It will be understood that the value of center frequency produced by synthesizer 14 is not in fact the center frequency of the carrier output on line 52, but rather is, in fact, 2N times the center frequency value of that output where N is the value of count in counter 44. The upper sideband generator 20 is receptive of the center frequency signal from synthesizer 14 and also an input from baud rate select 24 determined by a multi-bit signal input on line 26 to generate a desired upper band frequency.

With reference momentarily to FIG. 2, the output of upper sideband generator 20 is in fact the output from VCO 84U. The difference between the upper sideband signal frequency and that of synthesizer 14 is a function of the value of the maximum baud rate of the data signal input on line 32. Similarly, lower sideband generator 22 produces its output signal from VCO 84L which signal is as much below the center frequency signal produced by synthesizer 14 as the signal from upper sideband generator 20 is above the frequency produced by synthesizer 14. The upper and lower sideband frequency signals generated in generators 20 and 22 are applied to inputs of a single-pole, double-throw switch 30. Switch 30 outputs alternately the upper sideband frequency or lower sideband frequency dependent on the value of the data input signal as a function of time. An exemplary signal is shown as waveform 34. An exemplary center frequency of the frequencies passed by switch 30 would range between 10 kHz to 100 kHz with the upper sideband and lower sideband signals being in a range of, for example, 0.01% to 1% above or below the center frequency set by synthesizer 14.

The signal, at whatever frequency, output from switch 30 causes up/down counter 44 to alternately count up to its maximum value, for example, 10, and down to its minimum value, for example, 0, a difference of N. The output of counter 44 is a multi-bit digital signal which is applied to digital-to-analog converter 46 which produces, in response thereto, its output a triangular stairstep waveform as illustrated in FIG. 3.

With reference now to FIG. 3 there are shown two waveforms; one legended 110 and one legended 112. Waveform 110 results from the frequency of upper sideband generator 20 being applied to counter 44 and waveform 112 results from the frequency from lower sideband generator 22 being applied to up/down counter 44. It will therefore be noted in connection with FIG. 3 that the period $P_{HI}$ of waveform 110 is of necessity lower than the period of $P_{LO}$ of waveform 112. It should be understood that the difference in periods as illustrated in FIG. 3 is very much exaggerated. In point of fact, at the scale shown, it would be virtually impossible to show any difference in periods if the signals were drawn to an exact time scale.

Figure 4:
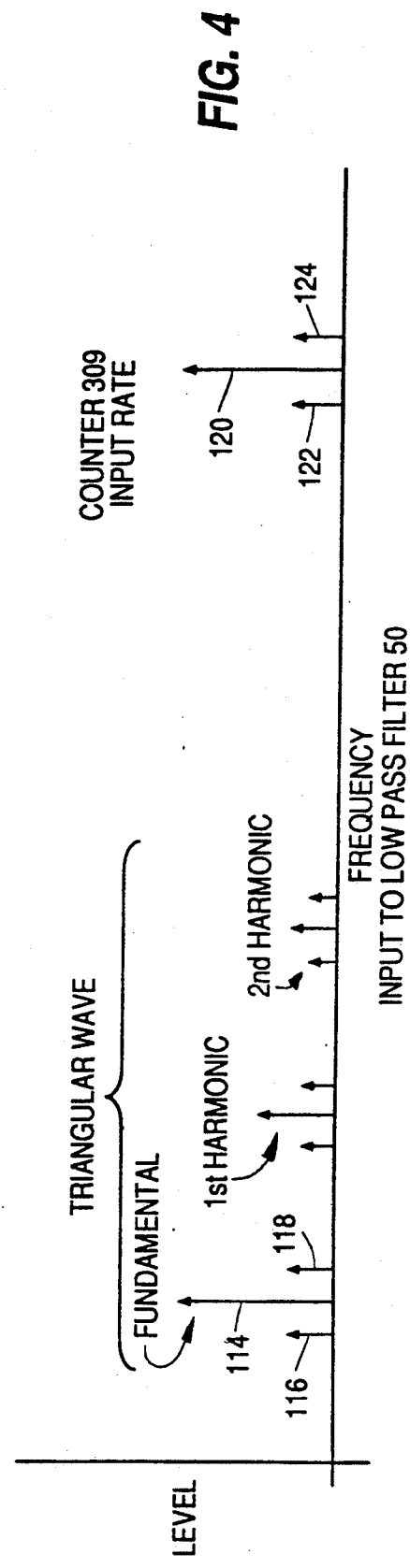
FIG. 4 is a waveform in the frequency domain which will be useful, in understanding the operation of the systems of FIGS. 1 and 2.

The output of converter 46 can also be illustrated in the frequency domain as it is so illustrated in FIG. 4 to which attention is now directed. In FIG. 4, the triangular wave produces a fundamental frequency illustrated in arrow 114 with its lower sideband component 116 and upper sideband component 118, respectively. There are also first and second and higher order harmonics all as illustrated in FIG. 4, which are of substantially lower signal level than is the fundamental.

It will be understood by those skilled in the art that the triangular waveform which is output from converter 46 is utilized because its fourier spectral components are similar to a sine wave amplifier output and can be created with a minimum amount of simple hardware. Such an arrangement eliminates sophisticated random access memory, read only memory, and support circuitry required to create a pure sine wave from converter 46 which is typically not needed for the desired type of output signal. It will be understood by a review of FIG. 4, however, that the frequency spectrum includes a center frequency 120 and its lower and upper sideband 122 and 124, respectively, which result from the input frequency signal to counter 98. This component of the frequency spectrum is, indeed, undesired. However, it is also substantially higher in frequency than the fundamental frequency 114 by a factor of 2N, where N is the count value in counter 44. As such, that frequency component is easily removed by a very simple low-pass filter 50, FIG. 1.

It will be understood that the higher the value of N in counter 44 the further out is the frequency component caused by the input to counter 44. This would seem to suggest that the larger the count value N the better. However, given a particular desired frequency of output from converter 46 it will be realized that the larger the count value, the larger the value required for frequency output from elements 14, 20, and 22 and the larger the value required as input on line 12. Utilizing readily available components, roughly the upper limit of input signal as reference on line 12 is on the order of 35 MHz so this along with the count value in counter 44 and other component values dictates the limits on output frequency and the value of N in counter 44.

When it is desired to transmit at a different center output frequency, higher or lower than the frequency value just utilized, it is a simple matter to select a different frequency by providing a different value on line 16 which change in value will be coherent with the rest of the circuity because of the fact that all input signals to the circuit of FIG. 1 are coherent with the reference signal applied on line 12. When the center frequency is thus changed, the output will quickly change to the new frequency dependent only on the speed with which VCOs 72, 84U, and 84L can change to their new respective values. Similar remarks apply if the maximum baud rate changes and with it the value of input signal to and output signal from baud rate select switch 24.

Although the circuit just described finds use in any frequency shift keying application, it is particularly useful for the class of shift keying, known as minimum shift keying, which is a special case of frequency shift keying wherein the difference between the frequencies related to the two values of binary data signal is at a minimum value still preserving orthogonality (zero cross hyphen correlation) between the upper and lower sideband values.

What is claimed is:

1. A frequency shift keying system for transmitting a signal representing supplied binary data, comprising in combination:

means responsive to the maximum baud rate of said supplied binary data for producing signals at first and second frequencies $f_1$ and $f_2$ that differ by an amount which is a function of the value of said maximum baud rate;

means for alternately counting up and down between two preselected counts which differ by value N, successive counts being at said first frequency when said data is at one of said binary values and successive counts being at said second frequency when said data is at the other of said binary values; and means responsive to the count in said means for counting as a function of time for producing said signal for transmission, the frequency of said transmission signal corresponding to $f_1/N$ or $f_2/N$ depending on the value of said supplied data.

2. The combination as set forth in claim 1 further including means for producing a reference clock signal and means responsive to said reference clock signal for producing a center frequency signal and wherein said means for producing signals at said first and second frequencies are further responsive to said center frequency signal for producing said first and second signals above and below, respectively, said center frequency in value.

3. The combination as set forth in claim 2 further including means producing a signal indicative of a desired center frequency and wherein said means producing said center frequency signal is responsive to said signal indicative of said desired center frequency for producing said center frequency at said desired value.

4. The combination as set forth in claim 3 wherein said means producing signals at said first and second frequencies produces said first and second frequencies symmetrically in value above and below said center frequency.

5. The combination as set forth in claim 4 wherein said means producing said first and second frequencies and means producing said center frequency each comprise voltage controlled oscillators for producing their respective frequencies.

6. The combination as set forth in claim 5 wherein said means for alternately counting up and down between two preselected counts comprises switch means receptive of said first and second frequencies for producing an output at said first frequency when said data is of one binary value and for producing an output at said second frequency when said data is of the other of said binary values and further including means responsive to the output of said switch means for counting up and down between values which differ by N at said first frequency when it is being output from said switch means and for counting up and down between values which differ by N at the rate of said second frequency when it is being output from said switch means.

7. The combination as set forth in claim 6 wherein said counter produces digital signals and wherein said means responsive to the count in said counter comprises a digital-to-analog converter for converting the digital output signal produced by said counter to an analog signal equivalent thereof.

8. The combination as set forth in claim 7 further including means responsive to the signal produced by said digital-to-analog converter for filtering out the signals at said frequencies $f_1$ and $f_2$ from the output transmitted signal.

9. The combination as set forth in claim 5 wherein said means for producing said first frequency comprises:

means for mixing the signals produced by said center frequency voltage controlled oscillator and first frequency voltage controlled oscillator to produce a signal corresponding to the difference in an absolute sense of the two frequency signals supplied to it;

means responsive to the same two voltage controlled oscillator output signals for producing a signal indicative of which of the two signals supplied to it is the higher in value, and;

means responsive to the signal which indicates whether the first frequency signal is higher or lower in value than the value of said center frequency and to said difference frequency for causing said voltage controlled oscillator producing said first frequency to transition above said center frequency when the value of said first frequency is below said center frequency.

10. The combination as set forth in claim 5 wherein said means for producing said second frequency comprises:

means for mixing the signals produced by said center frequency voltage controlled oscillator and second frequency voltage controlled oscillator to produce a signal corresponding to the difference in an absolute sense of the two frequency signals supplied to it;

means responsive to the same two voltage controlled oscillator output signals for producing a signal indicative of which of the two signals supplied to it is the higher in value, and;

means responsive to the signal which indicates whether the second frequency signal is higher or lower in value than the value of said center frequency and to said difference frequency for causing said voltage controlled oscillator producing said second frequency to transition below said center frequency when the value of said second frequency is above said center frequency.

* * * * *